United States Patent [19]
Morishige et al.

[11] Patent Number: 5,387,292
[45] Date of Patent: Feb. 7, 1995

[54] CORROSION RESISTANT STAINLESS STEEL

[75] Inventors: Norio Morishige, Yokosuka; Kenji Hirano, Yokohama; Kiyofumi Ishikawa, Hiratsuka; Shuji Furuya, Yokohama, all of Japan

[73] Assignee: Ishikawajima-Harima Heavy Industries Co., Ltd., Tokyo, Japan

[21] Appl. No.: 933,664

[22] Filed: Aug. 24, 1992

Related U.S. Application Data

[60] Division of Ser. No. 914,025, Jul. 15, 1992, Pat. No. 5,196,272, which is a continuation of Ser. No. 561,072, Aug. 1, 1990, abandoned.

[30] Foreign Application Priority Data

| Aug. 1, 1989 | [JP] | Japan | 1-199919 |
| Aug. 1, 1989 | [JP] | Japan | 1-199920 |
| Aug. 1, 1989 | [JP] | Japan | 1-199921 |
| Sep. 8, 1989 | [JP] | Japan | 1-234231 |
| Sep. 21, 1989 | [JP] | Japan | 1-245682 |

[51] Int. Cl.⁶ ............................... C23C 28/00
[52] U.S. Cl. ............................... 148/276; 148/277; 148/286; 148/287; 427/191; 427/328; 427/597; 428/557; 428/660; 428/663; 428/667
[58] Field of Search ............... 148/276, 277, 286, 287; 427/597, 191, 328; 428/557, 660, 663, 667

[56] References Cited

U.S. PATENT DOCUMENTS

| 2,461,518 | 2/1949 | Chace | 428/682 |
| 3,753,704 | 8/1973 | Manilla et al. | 75/204 |
| 4,212,900 | 7/1980 | Serlin | 427/597 |
| 4,431,447 | 2/1984 | Schick | 75/128 W |
| 4,496,635 | 1/1985 | Wang et al. | 428/680 |
| 4,530,719 | 7/1985 | Johnson et al. | 75/124 |
| 4,576,641 | 3/1986 | Bates et al. | 75/128 |

OTHER PUBLICATIONS

*Metals Handbook* (9th Ed.), vol. 6: Welding, Brazing, and Soldering, pp. 793–796; American Society for Metals, 1983.

Primary Examiner—Richard O. Dean
Assistant Examiner—Robert R. Koehler
Attorney, Agent, or Firm—Oblon, Spivak, McClelland, Maier & Neustadt

[57] ABSTRACT

The corrosion resistance inherent in stainless steel is further improved by a cladding layer provided on the surface thereof. The cladding layer is formed of a coating material which is applied onto the surface of the stainless steel and, then, burnt to be fused by laser beams. The coating material contains a larger amount of Cr than that of the stainless steel. The thus fused material and a fused portion of the stainless steel are mixed with each other to form the cladding layer of remarkable corrosion resistance due to a larger amount of Cr contained therein. The formation of the cladding layer on the inner surface of a small diameter pipe is enabled by a coating film shaping device which has a jig for shaping the applied material into a film of a uniform thickness and by a laser irradiation torch which has an arrangement for emitting the laser means radially outward from the inside of the pipe.

9 Claims, 4 Drawing Sheets

FIG.6
FIG.7
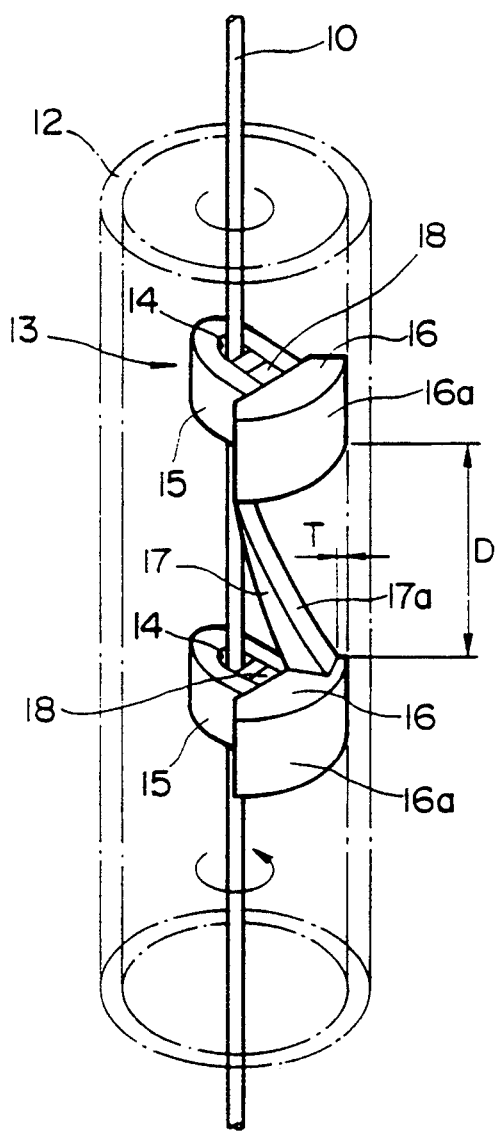
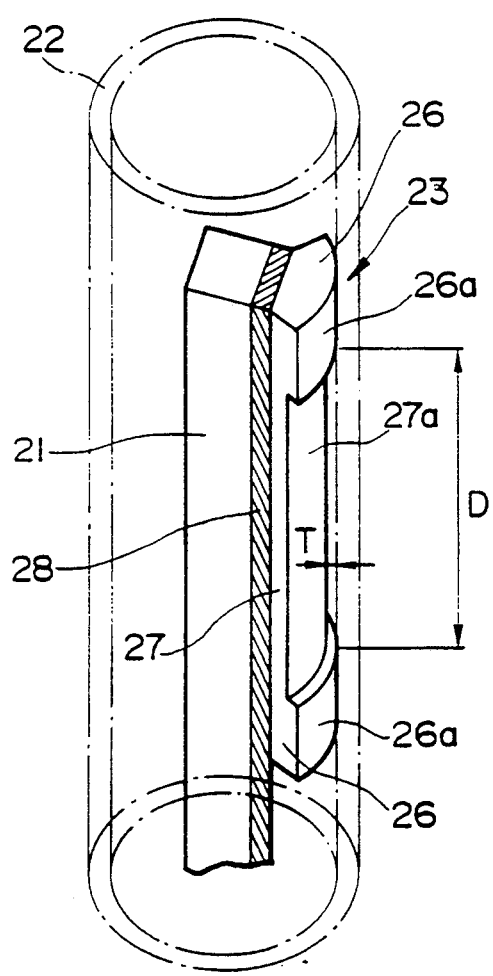

CORROSION RESISTANT STAINLESS STEEL

This is a division of application Ser. No. 07/914,025 now U.S. Pat. No. 5,196,272, filed on Jul. 15, 1992, which is a continuation of application Ser. No. 07/561,072, filed Aug. 1, 1990, now abandoned.

BACKGROUND OF THE INVENTION

The present invention generally relates to a technology for further improving the corrosion resistance inherent in stainless steel, more particularly to clad stainless steel remarkably improved in corrosion resistance and a cladding material for use in forming a cladding layer on the surface of stainless steel by the irradiation of a laser to improve the corrosion resistance. The invention also relates to a method of further improving the corrosion resistance of stainless steel, a device for forming a coating material film of uniform thickness on the inner surface of a pipe for the purpose of providing a coating layer of corrosion resistance or the like thereon, and a torch for irradiation of laser beams which is particularly suitable for irradiating a laser to the inner surface of a pipe.

In general, stainless steel is widely used in buildings, bridges, atomic plants, chemical plants and so on. The stainless steel inherently possesses good corrosion resistance, because, in the atmosphere, chromium in its structure combines with oxygen of the air to form a thin passive coating of chrome oxide on the surface of the stainless steel. However, in case the stainless steel is brought into contact with a corrosive fluid, such as hydrogen sulfide, chlorine ion and a hot water containing oxygen, pitting corrosion or cracks due to corrosion are liable to occur in the surface of the stainless steel.

Hitherto, when the potentiality of corrosion in the surface of the stainless steel is of concern, it has been considered to cope with this problem by using an acid or the like so as to strengthen its passive coating.

Even if a passive coating on the surface of the stainless steel is strengthened by acids or the like, however, it is impossible to prevent a corrosion phenomenon from gradually progressing unless a condition, in which the stainless steel is kept in contact with a corrosive fluid, is removed.

In view of the above, the present inventors have been thought of forming a cladding layer on the surface of the stainless steel with the use of a laser. This formation is particularly useful as a coating for the inner surface of a pipe to improve the corrosion resistance of pipes and the like in facilities for a nuclear reactor.

Meanwhile, hitherto, as a method of forming a film of a coating material for the purpose of providing a corrosion resisting coating layer on the surface of a metal, or for another purpose, brush coating, spraying or the like has been used. With these methods, although a coating material film of uniform thickness can readily be formed when a surface to be treated is exposed to the outside, it is difficult to form the same on the surface hiding inside, such as the inner face of a pipe. Particularly, it is impossible to partially form a coating material film at a deep position within the pipe. For the formation of such a cladding layer as described above, however, uniformly application of a coating material on the surface of stainless steel is necessary even when the objective to be treated is in a pipe shape. Thus, such a device, which is capable of readily forming a coating material of uniform thickness on the inner surface of a pipe, is desired.

Further, a laser has been applied to perforating in a plate, cutting and so forth, and various types of laser irradiation devices for these ends have been provided. However, only few devices among them are applicable to objectives which have surfaces of peculiar shapes to be treated. In particular, hitherto, there has been provided no device which can readily irradiate a laser to the inner surface of a pipe of a small diameter. The reasons for this are the technical difficulty that a device, or a torch, is disposed close to a portion to be treated where the material vigorously splashes and which reaches a high temperature, and little need of such a working. For the formation of a cladding layer described above, however, a device for readily irradiating a laser to the inner surface of a pipe with good operation efficiency is required. Thus, a torch capable of overcoming the above technical difficulty is desired.

SUMMARY OF THE INVENTION

The present invention has been accomplished in view of the foregoing, and it is an object of the invention to provide stainless steel which possesses remarkable corrosion resistance in addition to the corrosion resistance inherent in the stainless steel due to its passive coating.

Another object of the invention is to provide a material for cladding stainless steel, which can give the stainless steel good corrosion resistance in addition to the inherent corrosion resistance thereof due to its passive coating.

It is still another object of the invention to provide a method capable of surely adding good corrosion resistance to the surface of stainless steel.

It is still further object of the invention to provide a device with a coating material film of uniform thickness can readily be formed on the inner surface of a pipe.

It is still further object of the invention to provide a torch which can readily irradiate a laser to the inner surface of a pipe with good operation efficiency.

According to the first aspect of the invention, there is provided corrosion resistance stainless steel which comprises a cladding layer formed on a surface of a base metal of the stainless steel and containing Cr, Ni, Fe and Mo.

According to the second aspect of the invention, there is provided a material for cladding stainless steel, which comprises a metal powder of a chromium-based composite to be applied onto a surface of stainless steel and burnt by irradiation of a laser to form a cladding layer, said metal powder being a mixture of components including Cr, Ni and Mo.

Provided according to the third aspect of the invention is a method for improving corrosion resistance of stainless steel, which comprises the steps of: smoothing a surface of stainless steel; applying a coating material onto the surface of the stainless steel to form a coating film, the coating material being a mixture of a binder and a metal powder composed of a chromium-based composite; and burning the coating film by irradiating a laser to form a cladding layer for adding further corrosion resistance to the surface of the stainless steel.

According to the fourth aspect of the invention, there is provided a device for shaping a coating film on an inner surface of a pipe, which comprises a bar for insertion into a pipe, a coating film shaping jig attached to a side of the insertion bar, the coating film shaping jig being provided at an outer side thereof with at least one guide surface and at least one shaping surface spaced radially inward from the the guide surface by a distance corresponding to a thickness of a coating film to be formed, and means interposed between the coating film shaping jig and the insertion bar for urging the coating film shaping jig radially outward.

According to the fifth aspect of the invention, there is provided a torch for irradiating laser beams, which comprises a cylindrical torch body attached to an end of an optical fiber transmitting laser beams, lens means attached in the torch body for converging the laser beams irradiated from the optical fiber in a longitudinal direction of the torch body, a cylindrical body tube attached to an end of the torch body movably in the longitudinal direction thereof, the body tube being formed in a side wall thereof with an aperture, and a reflex mirror attached in the body tube for reflecting the laser beams having passed through said lens means to emit the laser beams outward through the aperture.

The torch body is preferable to be provided with a pipe passage in communication with the inside thereof for allowing a purge gas to be supplied. Further, the outer peripheral surfaces of the torch body and the body tube may be finished into metallically glossy faces as mirrors. It is preferable that the reflex mirror is made of a metal, such as copper, and has a reflecting surface which is mirror-finished. Alternatively, the reflex mirror may comprise a mirror plate for serving a reflecting surface which is attached by adhesion to a support member attached to the body tube.

In the stainless steel according to the first aspect of the invention, as the cladding layer is formed on the surface, the exposed surface of this cladding layer comes into contact with a corrosive fluid.

In this case, Cr, which is one component of the cladding layer and contributes to the corrosion resistance, may be set at an arbitrary amount larger than an amount of Cr in the base metal of the stainless steel. This makes it possible to provide very good corrosion resistance as compared with that of the stainless steel by itself. Additionally, the inclusion of a proper amount of Mo in the cladding layer prevents the occurrence of pitting corrosion in particular. Thus, the cladding layer having a large amount of Cr is formed on the surface of the stainless steel and, therefore, the corrosion resistance thereof can further be improved. This clad stainless steel brings about an excellent effect that it makes remarkable resistance to corrosion even in an environment wherein the inherent corrosion resistance of the stainless steel relying upon its passive coating is spoiled, namely in a condition that such factors as the presence of a corrosion fluid, the existence of residual tensile stress and so on overlaps with one another. Further, by the inclusion of a proper amount of Mo in the cladding layer, the occurrence of pitting corrosion can effectively be prevented.

The above material according to the second aspect of the invention, comprising the metal powder, is applied onto the surface of stainless steel to form a coating film by the method according to the third aspect of the invention. The coating film is then burnt by the irradiation of the laser to form the cladding layer. At this time, Cr, Ni and Mo composing the coating film are fused by the irradiation of the laser to mix with a fused part of the base metal of the stainless steel, so that the components of the former and those of the latter are diluted with one another. Accordingly, the composition of the cladding layer becomes substantially intermediate between the composition of the metal powder and that of the stainless steel. The thus formed cladding layer is remarkably improved in corrosion resistance as compared with the corrosion resistance of the stainless steel by itself, and can prevent cracks and the like from occurring. Further, by virtue of the addition of a suitable amount of Mo to Cr and Ni, the occurrence of pitting corrosion can be prevented.

A suitable amount of Fe may be added besides Cr, Ni and Mo. This addition brings about the result that the spreading of the cladding layer on the surface of the stainless steel is enhanced to further smooth the finished surface of the cladding layer, in addition to the above effects of the improved corrosion resistance excelling that of the stainless steel itself and the prevention of pitting corrosion.

It is preferable that the cladding material further comprises a binder which contains C. This component of the binder causes the coating film to be black, so that the reflection the laser beams can be lessened to improve the efficiency of burning. Further, the binder may contain a suitable amount of $SiO_2$ for improving the heat resistance of the coating film, making it possible to effect uniform burning while keeping the metal powder adhering onto the surface of the stainless steel.

With the cladding material according to the second aspect of the invention, therefore, the cladding layer is formed on the surface of the stainless steel by the irradiation of the laser. Accordingly, the corrosion resistance inherent in the stainless steel is further improved to provide remarkable corrosion resistance. Further, as this formation is performed in such a simple way that the coating film of the mixed material is burnt by laser beams, the method according to the third aspect of the invention is applicable to any surface of the stainless steel which requires corrosion resistance. The cladding material and the method according to the invention can bring about such excellent effects.

With the coating film shaping device according to the fourth aspect of the invention, after having applied a coating material of a sufficient thickness onto the pipe inner surface at a predetermined position thereof, the coating film shaping jig is inserted into the, pipe together with the insertion bar to be pressed against the predetermined position. In this condition, upon rotating the insertion bar, the coating film of a predetermined thickness can be shaped at the predetermined position. More particularly, the coating film shaping jig is pressed against the pipe inner surface by the urging means to bring the guide surface into contact with the pipe inner surface, and the jig is rotated with the shaping surface being spaced from the pipe inner surface by the thickness of the film to be formed. Accordingly, an extra coating material over the necessary for forming the film of the predetermined thickness, which corresponds to the distance between the guide surface and the shaping surface, is torn off by a shaping portion of the coating film shaping jig. Thus, the coating material applied at the predetermined position is shaped into the film of a uniform thickness.

This coating film shaping device brings about an effect that the formation of a coating film of uniform thickness on the inner surface of a pipe, which has been extremely difficult hitherto, can readily be realized by a simple working of applying a coating material onto the pipe inner surface and, then, rotating the jig inserted into the pipe.

With the laser irradiation torch according to the fifth aspect of the invention, the distance between the focal point of the laser beams and the torch body can be adjusted with easy by moving body tube in the longitudinal direction of the torch body. After having adjusted the distance in accordance with inner diameter of a pipe to be treated, the torch is inserted in the pipe along the inner surface thereof, and the rays of the laser are supplied through the optical fiber while rotating the torch body or moving the same in the longitudinal direction of the pipe. Then, laser can successively be irradiated to every portion of the inner surface of the pipe with the focal point situated in the vicinity of the pipe inner surface.

At this time, the rays of the laser irradiated from the optical fiber in the torch body are converged by the lens, changed in direction by the reflex mirror to be emitted laterally of the body tube, or in a direction toward the pipe inner surface, and form the convergent point of the rays in the vicinity of the pipe inner surface. By moving the body tube to change the focal point, only one torch can readily be adapted to pipes of various inner diameters.

When the pipe passage is provided in the torch body, a purge gas can be supplied through the pipe passage into the torch body during the operation. A part of the purge gas supplied in the torch body and the body tube blows out of the aperture through which the laser is emitted. This prevents a coating material and so forth splashed by the irradiation of the laser from entering the torch through the aperture. Accordingly, malfunctions due to the coating material and the like stuck on the reflecting face and so on are prevented. Further, the necessity of frequently doing the maintenance of the torch for replacement of the reflex mirror and so forth on which foreign substances stick is avoided.

Further, in case the outer surfaces of the torch body and the body tube are formed as mirrors, because the reflexibility is increased, the torch absorbs little energy of the reflected rays of the laser, and is not raised in temperature. Therefore, any cooling device is not necessary to be provided for preventing the deformation and deterioration of parts due to a high temperature, and the torch can be reduced in size or formed in a compact size. Moreover, when the reflex mirror, which is relatively short in life span as compared with other parts due to the heat by the laser and has to be periodically replaced, is made of a metal, such as copper, since the metal is relatively cheap in cost and good in processing, the manufacturing and maintenance costs of the torch can be reduced. On the other hand, when the reflecting face is formed by the mirror plate attached by adhesion to the support member, renewal of the reflex mirror can be made by replacing only the mirror plate. This reduces costs for the maintenance of the torch as compared with the case where the entire reflex mirror has to be replaced.

BRIEF DESCRIPTION OF THE DRAWINGS

FIGS. 1 to 4 are sectional views of stainless steel showing the processes of the corrosion resistance improving method according to an embodiment of the third aspect of the invention, wherein FIG. 1 shows the surface condition of the stainless steel before the treatment, FIG. 2 shows the surface condition after a smoothing treatment, FIG. 3 shows the condition after a film of a coating material has been formed, and FIG. 4 shows the condition after a cladding layer has been formed.

FIG. 6 is a perspective view of the device for shaping a coating film on a pipe inner surface according to an embodiment of the fourth aspect of the invention.

FIG. 7 is a perspective view of the device for shaping a coating film on a pipe inner surface according to another embodiment of the fourth aspect of the invention.

DETAILED DESCRIPTION OF THE PREFERRED EMBODIMENTS

Figure 1:
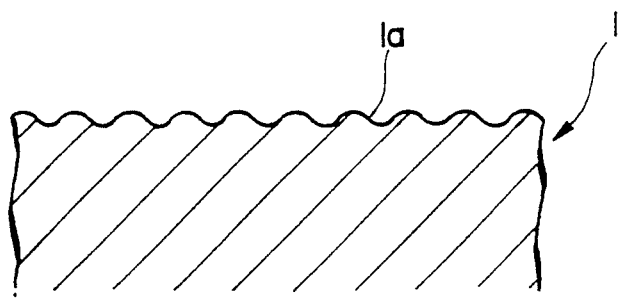

Description will now be made on embodiments of various aspects of the invention with reference to the drawings.

First, the corrosion resistance stainless steel according to an embodiment of one aspect of the invention will be described in conjunction with the corrosion resistance improving method and the cladding material according to embodiments of other aspects of the invention.

FIGS. 1 to 4 respectively show the surface conditions of stainless steel, which are different from one another in accordance with the progress of the method. In these figures, reference letter L represents laser beams, reference numeral 1 denotes the base metal of the stainless steel, 2 denotes a coating film of the material, and 3 denotes a cladding layer.

<SURFACE SMOOTHING PROCESS>

Figure 2:
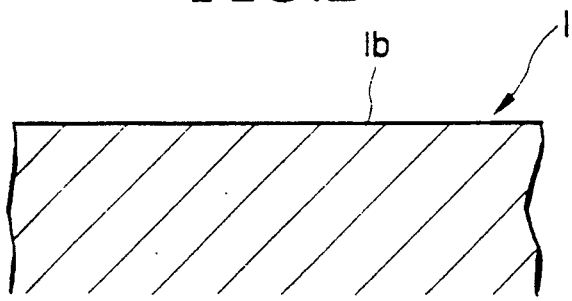

As shown in FIG. 1, in a condition before the corrosion resistance improving treatment, the stainless steel 1, formed in a plate or a pipe, may have roughness 1a which remains in its surface and so forth, or in the inner surface and so forth in the case of a pipe, due to scratches and the like during the manufacturing and subsequent processes. In such a case, the portion to the stainless steel, which need improving in corrosion resistance, is surface-finished by machining or surface polishing into a smooth with an precision of, for instance, the finish mark ▽▽▽ (surface roughness 1.5–6S:JIS) so as to be a smoothed surface 1b as shown in FIG. 2.

<DEGREASING PROCESS>

From the smooth-faced stainless steel 1, oils, fats, oxide scales, etc. stuck during the surface smoothing process are removed by cleaning with an organic solvent, pickling or the like.

After this degreasing process, however, the treated stainless steel 1 is directly exposed to the atmospheric air once again. Accordingly, the smoothed surface 1b comes into contact with oxygen of the air to be naturally formed with a thin passive coating.

<COATING FILM FORMING PROCESS>

As a main material for forming the cladding layer 3 which will be described later, a metal powder of a chromium-based composite is prepared. The compounding ratio of the chromium-based composite is set as shown in Table 1, and an average particle size of the metal powder is, for instance, 40 $\mu$m.

TABLE 1

(Examples of compounding of the metal powder)

| COMPOUNDING RATIO | Cr | Ni | Mo | Fe |
| --- | --- | --- | --- | --- |
| COMPOSITION 1 | 6 | 2 | 1 | 1 |
| COMPOSITION 2 | 4 | 4 | 1 | 1 |
| COMPOSITION 3 | 6 | 3 | 1 | 0 |

Further, as a binder for holding the metal powder, a heat resisting paint of organic solvent system or the like is prepared. The characteristics required for this binder are not to evaporate or discompose during the irradiation of a laser to remain within the cladding layer 3, and to have sufficient heat resistance for holding the metal powder on the surface to the base metal to be treated (stainless steel) at a slight distance from the laser beams. Moreover, in order to prevent the occurrence of hydrogen cracking in the base metal, the binder is preferable to be of a less hydrogen component and, for instance, a black paint set as shown in Table 2 is used.

TABLE 2

(Example of compounding of the binder)

| MATERIAL | COMPONENT RATIO (WT. %) |
| --- | --- |
| $AL_2O_3$ | LESS THAN 40 |
| $SiO_2$ | 10–60 |
| C | 20–50 |
| H | LESS THAN 2 |

Figure 3:
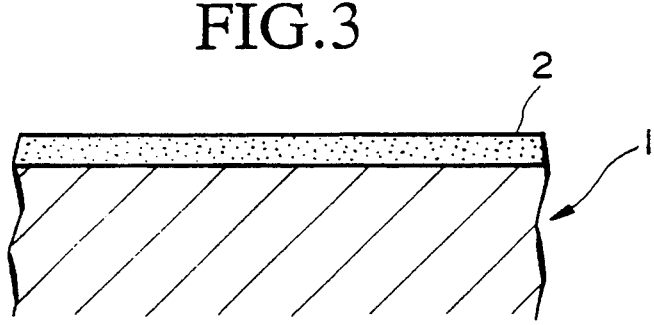

The mixed coating material of the metal powder comprising the chromium-based composite and the binder is applied on the surface of the stainless steel 1 as shown in FIG. 3, and is forcibly or naturally dried to form the coating film 2. A thickness of the coating film 2 in this case is, for instance, about 500 μm, and the coating film 2 used has heat resistance for adherently holding the metal powder on the surface of the stainless steel 1 up to a temperature of about 250° C.

\<BURNING PROCESS WITH LASER IRRADIATION\>

Figure 4:
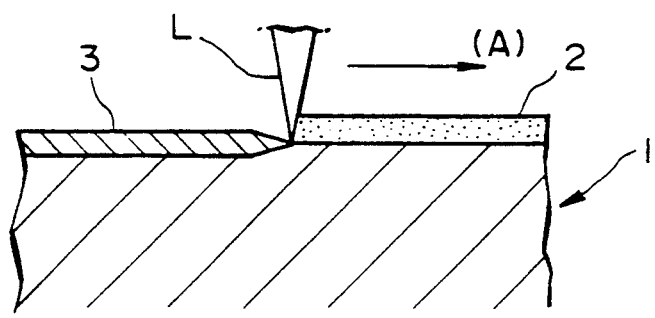

As shown in FIG. 4, is heated to be fused in the atmospheric air by the laser beams L, such as YAG laser. The laser beams L are moved as shown by an arrow (A) in FIG. 4 to successively burn the coating film 2. Then, fused portions behind the laser beams L come into solidification to form the cladding layer 3.

The burning treatment with the YAG laser is conducted to effect the burning in the atmospheric air in such a condition that the laser output is 600 W, the diameter of a spot in which the laser beams are converged is 0.8–2.5 mm, the speed of movement of the laser beams is 0.2–1.0 m/min., and the width of a bead, which is formed as the cladding layer when the laser beams pass one time, is 1.0–2.0 mm.

In this case, when the coating film 2 is in black color, namely when mixing a suitable amount of carbon black with the binder shown in Table 2, it is possible to lessen reflection of the laser beams L at the surface of the coating film 2 to improve the thermal efficiency. Further, when a suitable amount of $SiO_2$ is mixed with the binder, the coating film 2 is improved in its adhesion at a high temperature.. Accordingly, the metal powders in Table 1 can keep adhering onto the surface of the stainless steel 1 up to a high temperature of, for instance, about 250° C. when the combustion heat by the laser beams L is transmitted to the stainless steel 1 to gradually increase the temperature thereof. Thus, the metal powder can be burnt while uniformly adhering onto the surface of the stainless steel 1, making it possible to improve the operation efficiency of burning.

\<COMPONENTS OF CLADDING LAYER\>

By the laser beams L, a part of the base metal of the stainless steel 1, as well as the coating film 2, is fused. Both the components of the coating film 2 and those of the base metal of the stainless steel become a fused condition, resulting in a phenomenon that they mix with one another in the fused portion. Accordingly, the fused portion is of composition which is substantially intermediate in component ratio between the composition of the metal powder and that of the stainless steel 1. When the fused portion has solidified, therefore, formed is the cladding layer 3 as shown in Table 3.

TABLE 3

(Component ratio of the cladding layer)

| COMPONENT | COMPONENT RATIO (WT. %) |
| --- | --- |
| Cr | 15–50 |
| Ni | 5–30 |
| Mo | 1–4 |
| Fe | 40–60 |

When the thickness of the coating film 2 is about 500 μm, the cladding layer formed through burning by the laser beams L is about 250–300 μm in thickness, and the component ratio of the cladding layer 3 varies in accordance with compounding ration of the metal powder.

The clad stainless steel thus obtained and having the above components has a smooth surface with no defect, such as cracks and so forth, in the cladding layer 3.

In particular, the metal powders of composition 1 and composition 2 in Table 1 are good in the surface finish of the cladding layers 3. This is considered to result from the improved spreading of the cladding layers over the surface of the stainless steel 1 by the addition of a suitable amount of Fe.

\<EXAMPLE OF CORROSION TEST\>

For evaluating the corrosion resistance, clad stainless steel samples #1 to #15 were prepared, which had respective cladding layers different in component ratio. These samples were made of SUS 304 plates of 5 mm thickness and SUS 304 pipes of 35 mm inner diameter and by forming coating films of 500 μm with different coating materials on the surfaces of the plates and the inner surfaces of the pipes and burning these films by the laser. A corrosion test was performed to immerse the samples for thirty three hours in a boiling solution which contained NaCl of 5% concentration and was adjusted the PH value to 1 by adding sulfuric acid, and brought about the result shown in Table 4. In the evaluation column of Table 4, the mark X represents the occurrence of heavy corrosion, the mark Δ represents the occurrence of light corrosion, and the mark ◯ represents no occurrence of corrosion.

TABLE 4

(Result of the corrosion test)

| SAMPLE | COMPOUNDING RATIO OF METAL POWDER | | | | | EVALUATION | |
| --- | --- | --- | --- | --- | --- | --- | --- |
| | Cr | Ni | Mo | Nb | Fe | CRACK | CORROSION RESISTANCE |
| #1 | 10 | | | | | OCCURRENCE | X |
| #2 | 9 | 1 | | | | NONE | X |
| #3 | 7 | 3 | | | | OCCURRENCE | X |

TABLE 4-continued (Result of the corrosion test)

| SAMPLE | COMPOUNDING RATIO OF METAL POWDER | | | | | EVALUATION | |
|---|---|---|---|---|---|---|---|
| | Cr | Ni | Mo | Nb | Fe | CRACK | CORROSION RESISTANCE |
| # 4 | 9 | | 1 | | | OCCURRENCE | Δ |
| # 5 | 7 | | 3 | | | OCCURRENCE | Δ |
| # 6 | 9 | | | 1 | | NONE | X |
| # 7 | 7 | | | 3 | | NONE | X |
| # 8 | 9 | | | | 1 | NONE | X |
| # 9 | 7 | | | | 3 | NONE | X |
| # 10 | 2 | 7 | 1 | | | NONE | ◯ |
| # 11 | 3 | 6 | 1 | | | NONE | ◯ |
| # 12 | 6 | 3 | 1 | | | NONE | ◯ |
| # 13 | 2 | 6 | 1 | | 1 | NONE | ◯ |
| # 14 | 4 | 4 | 1 | | 1 | NONE | ◯ |
| # 15 | 6 | 2 | 1 | | 1 | NONE | ◯ |

The ratios of components Cr, Ni, Mo and Fe of the respective cladding layers formed are as follows:
sample #1—38.2:0.0:0.38:61.4,
sample #2—31.06:8.5:0.08:59.8,
sample #3—35.3:13.0:0.12:51.7,
sample #4—39.2:13.5:0.0:47.4,
sample #5—39.1:6.3:2.14:52.5,
sample #6—50.8:4.4:9.08:35.8,
sample #7—54.0:4.6:0.12:41.3,
sample #8—73.05:1.6:0.08:24.8,
sample #9—28.4:7.0:0.47:64.1,
sample #10—19.3:24.1:2.13:54.4,
sample #11—19.7:17.6:1.76:61.0,
sample #12—14.3:8.1:2.70:74.9,
sample #13—19.4:25.6:3.06:52.0, and
sample #14—30.0:12.3:2.45:55.3.

Figure 5:
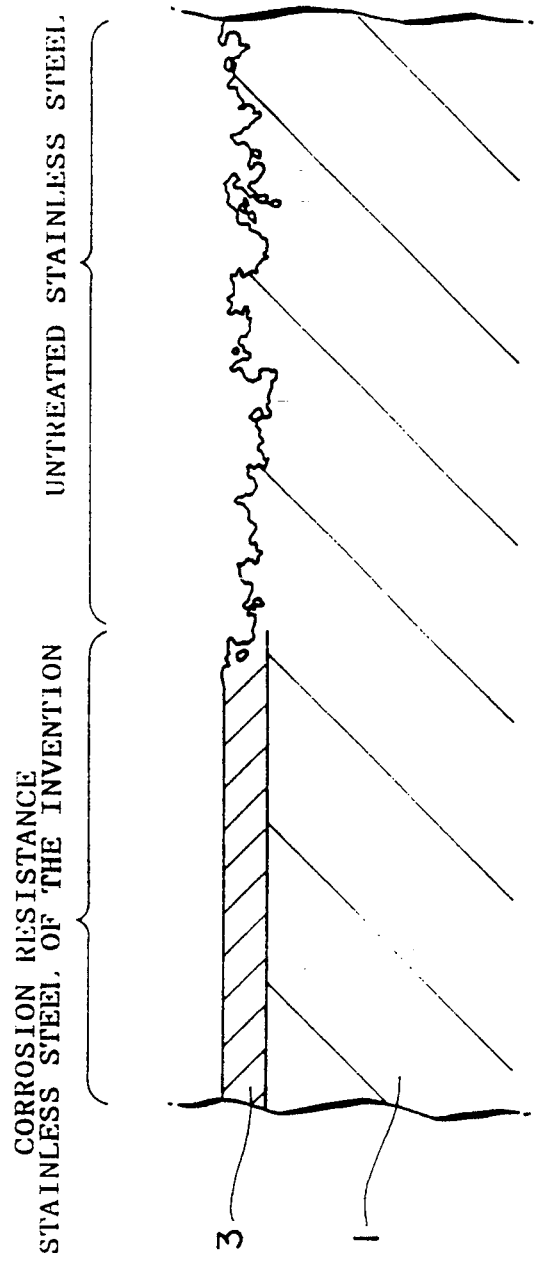
FIG. 5 is a sectional view separately showing, on the left half part thereof, a surface condition after a corrosion test of the corrosion resistance stainless steel according to an embodiment of the first aspect of the invention and, the right half part, that of SUS stainless steel without the surface treatment.

A similar test was performed on a test piece without the surface treatment, which was the base metal of SUS 304 stainless steel itself and had no cladding layer formed thereon. As a result, heavy corrosion occurred in this test piece as shown on the right half part in FIG. 5, whereas the sample #15 formed with the suitable cladding layer 3 was smooth at its surface and kept in its previous state before the corrosion test as shown on the left half part in FIG. 5.

It was verified from the above result of the corrosion test that samples #10 to #15 of the clad stainless steel shown in Table 4 had no occurrence of any crack and brought about an excellent effect on the corrosion resistance.

Incidentally, in case the surface to be treated is the inner surface of a stainless steel pipe, the laser beams, such as YAG laser, can be irradiated with use of the devices according to embodiments of other aspects of the invention, which will be described later. Accordingly, the method of the invention is applicable to the pipe of a small diameter, for instance, that of about 35 mm diameter.

The device for shaping a coating film on the inner surface of a pipe according to an embodiment of still another aspect of the invention will be described with reference to FIG. 6.

In FIG. 6, denoted by reference numeral 10 is an insertion bar. The insertion bar 10 is capable of being inserted into a pipe 12, on an inner surface of which a coating film is to be formed, and is adapted to be driven by a driving device, not shown in the figure, to rotate on its own axis.

A coating film shaping jig 13 is attached to this insertion bar 12. The coating film shaping jig 13 is composed of mounting portions 15, 15 each having elongated holes 14 through which the insertion bar 10 is inserted, guide portions 16, 16 which are respectively attached to one ends of the mounting portions 15, 15, and a shaping portion 17 provided to interconnect the guide portions 16, 16. The guide portions 16, 16 have respective guide surfaces 16a which are formed to come into contact with the inner surface of the pipe 12. Further, the shaping portion 17 is situated inward of the guide surfaces 6a by a thickness T of the coating film robe formed, and has a shaping surface 17a formed into a band shape which is spirally twisted as a whole with respect to the insertion bar 10.

The two guide portions 16, 16 are spaced from each other in the longitudinal direction of the pipe by a length D corresponding to an extent through which the coating film is to be formed. In other words, a length of the shaping portion 17 in the longitudinal direction of the pipe is set to be equal to the length D.

Biasing or urging devices 18 are provided in the respective elongated holes 14, 14 of the coating film shaping jig 13 to be interposed between the insertion bar 10 and rear sides of the guide portions 16. The urging devices 18 comprising, for instance, springs or the like, exert forces for widening the distances between the insertion bar 10 and the respective rear sides of the guide portions 16, so that the coating film shaping jig 13 as a whole is urged toward the pipe inner surface to bring the guide surfaces 16a of the guide portions 16 into contact with the pipe inner surface.

Here, in case the pipe 12 is arranged in a vertical direction as shown in FIG. 6 and the coating film is to be formed at a specific position of the inner surface of the pipe, a necessary amount of a coating material is first applied to the specific position. Then, the insertion bar 10 is axially inserted into the pipe 12, and the shaping portion 17 of the coating film shaping jig 13 is located at the specific position. In this state, when the insertion bar 10 is rotated in a direction as indicated by an arrow in FIG. 6, the coating film of the predetermined thickness T can be formed through the extent which is of a width corresponding to the length D.

More particularly, the coating film shaping jig 13 is pressed against the inner surface of the pipe 12 by the urging devices, and is rotated along the pipe inner surface in a condition that the guide surfaces 16a, 16a of the guide portions 16, 16 are kept in contact with the pipe inner surface and the shaping surface 17a of the shaping portion 17 is spaced from the pipe inner surface by the thickness T of the film. Accordingly, an extra coating material, which is over the necessary for forming the film of the predetermined thickness T, is torn off by the shaping portion 17 of the coating film shaping jig 13, so that the coating material applied onto the inner surface of the pipe 12 is shaped into the film of a uniform thickness.

At this time, as the shaping surface 17a is twisted with respect to the axis of the pipe, the coating material is always spread upward to spread over the entire inner periphery of the pipe so as to form the coating film. During the processing, therefore, drooping or lowering of the coating material is prevented. Further, even when the insertion bar is not located correctly along the axis of the pipe, the coating film shaping jig is moved to absorb such a difference, so that the same can readily be rotated with the guide portion thereof being always kept in contact with the pipe inner surface.

According to the coating film shaping device of the above embodiment, brought about is an effect that forming of the coating film of uniform thickness, which has been extremely difficult hitherto, can readily be realized by a simple working of applying the coating material onto the pipe inner surface and, then, rotating the jig inserted into the pipe.

Further, even when the pipe is arranged along a vertical direction, as the coating material is prevented from drooping or lowering during the processing, a defect, such as uneven portions partially formed in the coating film due to drooping or lowering coating material, etc., is avoided, and the coating film of good quality is obtained.

Moreover, the coating film shaping device of the above embodiment has the shaping portion 17 situated between the two guide portions 16, so that the distance D between the guide portions corresponds to a width of which the coating film is formed. Therefore, the device has an effect that the extent of formation of the coating film can be set with accuracy by the adjustment of this distance D. Further, the thickness of the coating film can readily be set by adjusting the size T.

Furthermore, since the coating film shaping device of the above embodiment can be operated by a very simple operation of rotating the insertion bar about its own axis, it has an effect that the driving device may be a simple device which uses the known art.

Subsequently, the coating film shaping device according to another embodiment of the fourth aspect of the invention will be described with reference to FIG. 7.

In FIG. 7, denoted by reference numeral 21 is an insertion bar. The insertion bar 21 is capable of being inserted into a pipe 22, on an inner surface of which a coating film is to be formed, and is adapted to be driven by a driving device, not shown in the figure, to rotate round along the pipe inner surface.

A coating film shaping jig 23 is attached to the insertion bar 12 on the side thereof facing the inner surface of the pipe 22. The coating film shaping jig 23 includes guide portions 26, 26 which have respective guide surfaces 26a formed to come into contact with the inner surface of the pipe 22, and a shaping portion 27 provided to interconnect the guide portions 26, 26 and having a guide surface 27a which is formed to lie inward of the guide surfaces 26a by a distance corresponding to the thickness T of the coating film to be formed.

The two guide portions 26, 26 of the coating film shaping jig 23 are spaced from each other in the longitudinal direction of the pipe by the length D corresponding to an extent through which the coating film is to be formed. In other words, a length of the shaping portion 27 in the longitudinal direction of the pipe is set to be equal to the length D.

A biasing or urging device 28 is interposed between the coating film shaping jig 23 and the insertion bar 21. The urging device 28 is made of a material of good resilience, such as rubber or the like.

In case of forming the coating film at a specific position of the inner surface of the pipe 22 which is arranged, for instance, along a vertical direction as shown in FIG. 7, a necessary amount of a coating material is first applied to the specific position. Then, the insertion bar 21 is inserted into the pipe 22, and the coating film shaping jig 23 is pressed against the specific position. In this state, when the insertion bar 21 is rotated round along the pipe inner surface, similarly to the case of the device shown in FIG. 6, the coating film of the predetermined thickness T can be formed through the extent which is of a width corresponding to the length D.

The coating film shaping device of the second embodiment brings about an effect, similarly to the device shown in FIG. 6, that the formation of the coating film of uniform thickness, which has been extremely difficult hitherto, can readily be realized by a simple working of applying the coating material onto the pipe inner surface and, then, rotating the jig inserted into the pipe.

Incidentally, although in the device shown in FIG. 7, the shaping surface 27a of the coating film shaping jig 26 is illustrated to be substantially equal in width to the guide surfaces 26, the shaping surface is not limited solely to this specific form. For example, the shaping surface may be in a band shape of a small width which is twisted with respect to the insertion bar 21 as is in the case of the device shown in FIG. 6. In this case, similarly to the device shown in FIG. 6, an effect of preventing lowering or drooping of the coating material is brought about.

Contrarily, such a jig as the coating film shaping jig 23 of the device shown in FIG. 7 may be used in the device shown in FIG. 6.

Description will next be made on the laser irradiation torch according to an embodiment of still further aspect of the invention with reference to FIG. 8.

Figure 8:
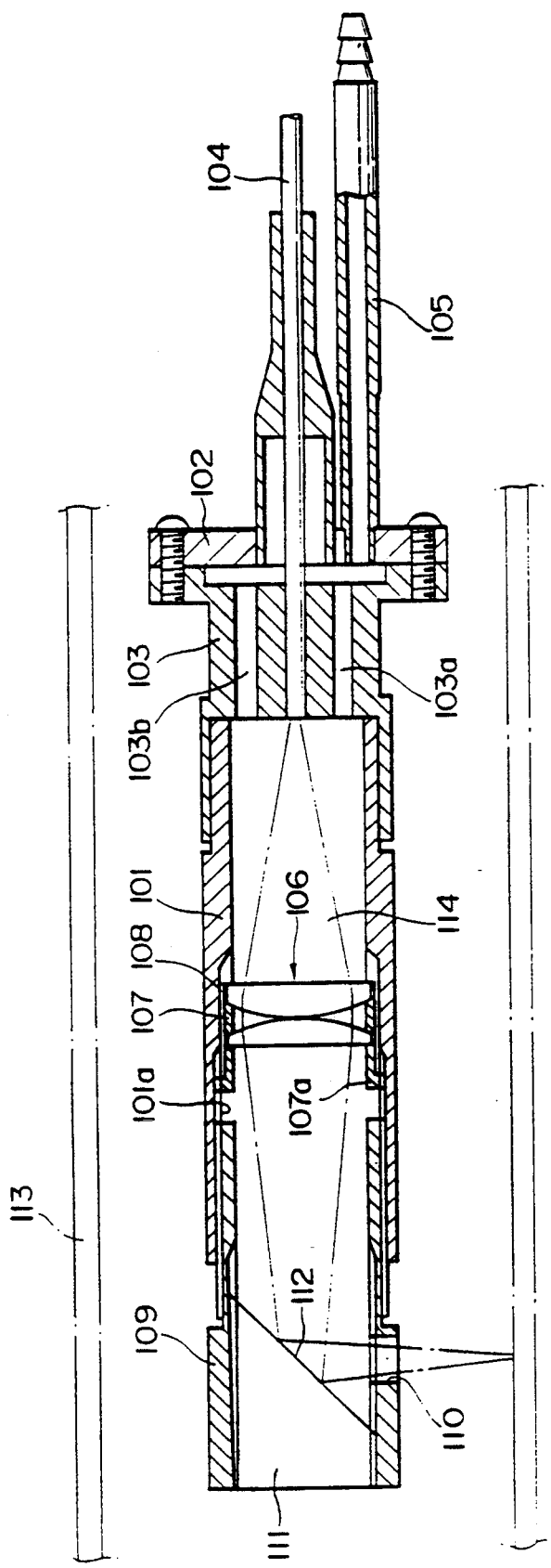
FIG. 8 is a sectional side view of the torch for irradiating a laser according an embodiment of the fifth aspect of the invention.

FIG. 8 is a sectional side view of the laser irradiation torch, wherein reference numeral 101 denotes a torch body. The torch body 101 is formed in a substantially cylindrical shape as a whole, and is formed with screw threads 101a in an inner periphery at one end of the torch body. An optical fiber 104 and a pipe passage 105 are connected via fixing flanges 102, 103 to the opposite end the torch body 101 to the one end at which the screw threads are formed. The optical fiber 104 is connected to a laser generating apparatus, not shown in the figure, to transmit the rays of a laser. The end of the optical fiber is disposed on the center line of the torch body to irradiate the laser beams along the center line. The pipe passage 105 is in communication with the inside of the torch body 101 through flow passages 103a, 103b formed in the fixing flange 103, and is connected to a gas cylinder or a compressor, not shown, for supplying a purge gas into the inside of the torch body.

In the torch body 101, a lens assembly 106 is provided to converge the laser beams irradiated from the optical fiber 4. The lens assembly 106 is composed of two semispherical lenses, and is fixed at its outer periphery in a cylindrical member 107. The cylindrical member 107 has a flanked portion 107a brought in screw engagement with the screw threads 101a, and the lens assembly is installed in the torch body 101 via the cylindrical member 107. The spaces in the torch body 101 on the both sides of the lens assembly 106 are communicated with each other through a through hole (not shown) and a clearance 108 between the cylindrical member 107 and the inner surface of the torch body 101, which through hole is formed in the vicinity of the flanged portion 107a of the cylindrical member 107. Thus, the inside of the torch body 101 is not blocked even the provision of the lens assembly 106.

Incidentally, the lens assembly 106 is not solely limited to the assembly of the two semi-cylindrical lenses, and may be composed of a double-convex lens or a meniscus lens.

A body tube 109 is provided at the free end of the torch body 101. The body tube 109 is formed in a substantially cylindrical shape as a whole. The body tube 109 is formed in outer periphery at one end thereof with screw threads which are brought in screw engagement with the screw threads 101a, and through a side wall on the other end side thereof with a small hole 110. The body tube 109 screws at the one end thereof in the torch body 101 to be installed on the torch body movably in the longitudinal direction thereof.

The diameter of the small hole 110 is preferable to be as small as possible. For instance, when the outer diameter of the torch is 20 mm, it is desirable for the diameter of the small hole to be less than 5 mm.

A reflex mirror 111 is provided in the inside on the free end side of the torch body 101. The reflex mirror 111 is formed of a column member which is made of copper and is obliquely cut at an angle of 45° with respect to the center line of the member. The cut end of the member is mirror-finished to form a reflecting face 112. The reflex mirror 111 screws at its outer periphery in the torch body 101 to be detachably installed thereon.

The mirror-finish of the reflecting face 112 may be performed by, for instance, buffing or the like. Further, the installation position and posture of the reflex mirror 111 are so set that it reflects the laser beams having passed through the lens assembly 106 to emit the same through the small hole 110 laterally of the body tube 109.

The outer surfaces of the torch body 101 and the body tube 109 may coated with aluminum or nitriding titanium to be formed in mirrors.

With the torch for irradiation of the laser structured as above, in accordance with the inner diameter of a pipe in which the laser is to be irradiated, the body tube 109 is rotated to move for adjustment of the focal position of the laser beams irradiated from the optical fiber 104. After the adjustment, the torch is inserted in the pipe 113 along the center line thereof, and the rays of the laser are supplied, while rotating or moving the torch, with the purge gas being supplied through the pipe passage 105. Then, the laser can successively be irradiated to every position of the inner surface of the pipe 113 with the converging point located in the vicinity of the inner surface of the pipe 113.

More particularly, at this time, the laser beams 114 irradiated from the optical fiber 104 are converged by the lens assembly 106, and are changed in direction by the reflex mirror 111 to be emitted laterally of the body tube 109, or toward the inner surface of the pipe 113, through the aperture 110 of the body tube 109 to form a convergent point in the vicinity of the inner surface of the pipe 113.

During the operation, the purge gas is being supplied in the torch body 101 and the body tube 109, and a part of the gas blows out of the small hole 110 through which the laser is emitted. Accordingly, in combination with the effect that the diameter of the hole 110 is set to be small, a coating material and so on splashed by the irradiation of the laser are prevented from entering the torch through the aperture 110.

Further, when the outer surfaces of the torch body 101 and the body tube 109 are formed as mirrors, as the reflexibility is made large, the torch absorbs very little energy of the reflected rays of the laser irradiated and, therefore, is not raised in temperature.

As the purge gas, an inert gas, such as argon, air or the like may be used. Further, as a source of the purge gas, any device may be used if it can supply the gas at a higher pressure than a pressure in the pipe 113 which is the atmosphere of the torch. For example, as described above, a gas bomb or cylinder, or a gas compressor may be used for this end. Moreover, in case a flexible optical fiber is used as the optical fiber 104 and a purge gas supply hose connected to the pipe passage 105 is flexible, rotation and movement of the torch can readily be performed by a driving device which uses the conventional art.

The torch shown in FIG. 8 and described above brings about the following merits. Namely, the torch is capable of being inserted in a pipe and readily and successively irradiating a laser to every portion of the pipe, and can prevent a coating material and the like splashed by the laser at that time from entering the torch. Accordingly, malfunctions due to the coating material and so forth stuck on the reflecting face or the like are prevented. This also avoids the necessity of frequently doing the maintenance of the torch for replacing the reflex mirror or the like on which foreign substances stick.

In consequence, the irradiation of a laser to the inner surface of a small diameter pipe can readily be performed with good operation efficiency, which irradiation has been difficult hitherto unless overcoming the unfavorable condition that the irradiation is carried out with a torch being close to the objective to be irradiated the laser and, therefore, foreign substances tend to enter the torch.

Further, the torch of the above embodiment absorbs very little energy of the reflected rays of the laser and, thus, the temperature of the torch does not raise. Therefore, it is not necessary to provide a cooling device for preventing the deformation or deterioration of parts because of a high temperature, and the torch can be reduced in size.

Moreover, the reflex mirror 111, which is relatively short in life span due to the temperature by the laser as compared with other parts and has to be periodically replaced, is formed of copper which is cheap in cost and good in workability. Therefore, reduction in the manufacturing and maintenance costs of the torch can be realized.

Subsequently, the torch according to the another embodiment of the fifth aspect of the invention will be described with reference to FIG. 9.

The torch of the second embodiment is featured by the structure of a reflex mirror, and the other structural portions and the operation of this torch are identical with those of the torch of the first embodiment.

Figure 9:
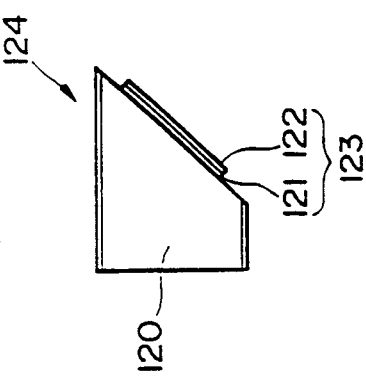
FIG. 9 is a side view of a reflex mirror for explanation of the laser irradiation torch according to another embodiment of the fifth aspect of the invention.

More particularly, the reflex mirror 124 is composed of a support member 120 and a mirror plate 123 as shown in FIG. 9. The support member 120 is formed in substantially the same configuration as that of the reflex mirror 111 of the first embodiment, and is adapted to be installed on the body tube 109. The mirror plate 123 comprises a base plate 121 which is made of a carbon fiber reinforced resin, and on one side of which formed is a coating layer 122 of aluminum or gold. The mirror plate 123 is attached by adhesion to the obliquely cut end of the support member 120 with the coating layer 122 facing outward to form a reflecting face.

According to the torch of the second embodiment, in addition similar merits to those of the torch of the first embodiment, the following result is achieved. For renewal of the reflex mirror 124, only the mirror plate 123 adhered to the support member 120 may be replaced. Accordingly, the maintenance cost for this end can be reduced as compared with the case where the whole of the reflex mirror has to be replaced.

What is claimed is:

1. A method for improving corrosion resistance of stainless steel, comprising the steps of: smoothing a surface of stainless steel; applying a coating material onto the surface of said stainless steel to form a coating film, said coating material comprising a mixture of a metal powder containing a chromium-based composite and a binder for adhesively holding said metal powder on the surface of said stainless steel; and burning the coating film by irradiating with a laser to form a cladding layer, wherein said binder comprises, based on the total weight of said binder, 10-60 weight % $SiO_2$, 20-50 weight % carbon, less than 40 weight % $Al_2O_3$, and less than 2 weight % hydrogen.

2. A method according to claim 1, wherein said stainless steel comprises Cr, Ni, and Fe; and wherein said cladding layer comprises, based on the total weight of said cladding layer, 15-40 weight % Cr, 17-30 weight % Ni, 40-60 weight % Fe and 1-4 weight % Mo, such that the amount of Cr and Ni in weight % in said cladding layer satisfies the following equation:

$$Cr/25 + Ni/80 > 1.$$

3. A method according to claim 2, wherein said metal powder comprises, in weight ratio, 2-6 parts Cr, 2-7 parts Ni, and at least 1 part Mo.

4. A method according to claim 2, wherein the grains of said metal powder have a diameter of approximately 40 μm.

5. A method according to claim 2, wherein said coating film has a thickness of approximately 500 μm.

6. A method according to claim 1, wherein said binder can adhesively hold said metal powder during said irradiation with said laser.

7. A method according to claim 6, wherein said binder is heat resistant to at least 250° C.

8. A method according to claim 6, wherein said binder does not evaporate during said irradiation with said laser.

9. A method according to claim 6, wherein said binder does not decompose during said irradiation with said laser.

* * * * *